3,222,271
PROCESS FOR REJUVENATING CATALYSTS
Aubrey L. McClellan, El Cerrito, Calif., assignor to California Research Corporation, San Francisco, Calif., a corporation of Delaware
No Drawing. Filed July 30, 1963, Ser. No. 298,542
6 Claims. (Cl. 208—110)

The present invention relates to catalystic conversion processes and to the rejuvenation of catalysts which become deactivated to a difficultly regenerable condition after long exposure to hydrogenative conversion conditions. More especially, the invention relates to a catalytic hydrocracking process for converting petroleum distillates and residua to various valuable products for sustained periods of on-stream operation and relates more particularly to the rejuvenation of hydrocracking catalysts which after long exposure to hydrocarbon feed under hydrocracking conditions have become deactivated and so changed that conventional removal of the accumulated carbonaceous deposits does not regain an appreciable or substantial percentage of the original hydrocracking activity.

Although catalytic hydrocracking is recognized as one of the most useful processes available to modern petroleum refiners and in its preferred form can be operated for long on-stream periods under reasonable conditions, the economic attractiveness of the process could be further improved by a procedure for satisfactory regeneration of the hydrocracking catalysts after they have become deactivated by long on-stream periods of operation.

As shown in Scott Patent No. 2,944,006, hydrocracking processes to convert hydrocarbon feed to valuable products can be carried out for long on-stream periods at reasonable operating conditions without intolerable catalyst fouling rates with a sulfide of nickel or cobalt disposed on an active siliceous cracking catalyst support, provided the hydrocarbon feed brought into contact with such catalyst has a low nitrogen content. However, it has been found that such catalysts after such long exposure to hydrocarbon feed under hydrocracking conditions become deactivated with the metal component so changed that conventional removal of the accumulated carbonaceous deposits does not result in the catalyst regaining an adequate or substantial percentage (i.e., more than 25–30%) of its original hydrocracking activity. During the long exposure to hydrocracking and other hydrogenative conversion conditions, such catalysts undergo a change which appears to be related, at least in part, to a crystallite growth phenomenon of the hydrogenating metal component of the catalyst. This crystallite growth phenomenon either brings about or is related to the inability of the hydrocracking catalyst to be regenerated by conventional regeneration procedures to an adequate proportion of its fresh catalyst activity. As a consequence, the regeneration by combustion of the carbonaceous deposits, as heretofore proposed as a means of regenerating deactivated hydrocracking catalysts, is not very effective since the hydrogenating metal remains in a form which is substantially inactive.

Therefore, the present invention provides a method for restoring such deactivated catalysts to a substantially greater degree than obtainable through regeneration by combustion of the carbonaceous deposits.

Further, it is highly desirable to be able to restore catalyst activity by treatments conducted in situ without having to remove the large amounts of catalysts normally contained in fixed-bed reactors. The present invention provides a method for in situ catalyst rejuvenation with a non-aqueous treatment and hence avoids contacting the catalyst with aqueous solutions which usually have a deleterious effect on catalyst activity.

In accordance with the present invention, the deactivated catalyst is contacted with dry sulfur chloride at a temperature above 100° F. up to the boiling point of the sulfur chloride for at least one hour. Then, after removing unreacted sulfur chloride, such as by washing with a non-aqueous solvent, the catalyst is heated in a dry oxidizing atmosphere at 700 to 1000° F. for at least one hour.

This procedure, which is described in more detail below, gives a rejuvenated catalyst having a substantial percentage of the original hydrogenative conversion activity. This result is surprising since a hydrogenating metal component such as nickel shows no appreciable solubility in sulfur chloride and dissolution in the treating agent would appear to be necessary for redistribution of the hydrogenating metal component into a finely divided form which is much more catalytically active than the large crystallites in the deactivated catalyst. Thus, when nickel metal was subjected to boiling sulfur monochloride for two hours, less than 0.03% of the nickel was dissolved. Nevertheless, the treatment with liquid sulfur chloride plus the heating step does give a substantial redistribution and activation of the large hydrogenating metal crystallites in the deactivated catalyst.

The sulfur chloride must be the liquid state during the treatment since, as shown below, treating with sulfur monochloride in a gaseous state does not bring about any appreciable reactivation of the catalyst. Similarly, other gaseous treating agents such as chlorine gas probably would not be effective.

The above-noted low solubility of hydrogenating metal component allows the catalyst to be contacted with substantial amounts of liquid sulfur chloride without losing appreciable amounts of the catalytic metal to the treating solution. Thus, the catalyst-containing reactor may be filled, at least to a level above the top of the catalyst bed, with liquid sulfur chloride and after the contacting period, the sulfur chloride can be drained from the reactor (and the remaining sulfur chloride washed out with a solvent), all without appreciable loss of hydrogenating metal from the catalyst.

The liquid sulfur chloride is preferably sulfur monochloride ($S_2Cl_2$; boiling point: 276° F.) or sulfur dichloride ($SCl_2$; boiling point: 138.2° F.). Other sulfur chlorides are less stable and hence are not usually suitable. Although the most effective sulfur chlorides are those containing only sulfur and chlorine, the stable liquid sulfur oxychlorides such as $SOCl_2$ and $SO_2Cl_2$ may be used. All these sulfur-chlorine compounds must be kept dry to avoid decomposition and hence the reactor and feeding lines should be free of water before introducing the sulfur chloride.

As indicated above, the sulfur chloride treatment is applied to a supported hydrogenating catalyst which before long exposure to hydrocarbon feed under hydrogenative conversion conditions in an active catalyst composed of at least one hydrogenating metal component selected from Group VIII metals and compounds thereof, exclusive of noble metals and compounds thereof, disposed on a high surface area support, but which catalyst after long exposure to hydrocarbon feed under hydrogenative conversion conditions has accumulated carbonaceous deposits and has become deactivated with the metal component so changed that conventional removal of the accumulated carbonaceous deposits does not result in recovery of an adequate percentage of the original hydrogenative conversion activity. In the process, the catalyst preferably is contacted with the liquid sulfur chloride before the carbonaceous deposits are removed from the catalysts, since better results are usually obtained with the catalyst in this condition.

The volume of sulfur chloride brought into contact with the catalyst is usually enough to cover the bed of catalyst. Alternatively, although usually less satisfactory for obtaining good contact with the catalyst, the sulfur chloride can be circulated through the catalyst in a downflow arrangement.

The contacting of the deactivated catalyst with the sulfur chloride is continued for at least one hour, preferably two–five hours, at temperatures from about 100° F. to the boiling point of the sulfur chloride used, the longer times being used with the lower temperatures. Usually no more than two days contacting is required. Suitable agitation is provided such as by the boiling of the sulfur chloride to insure thorough contact between the catalyst and the sulfur chloride.

After draining the liquid sulfur chloride from the catalyst, non-aqueous solvents for sulfur chloride, such as benzene, hexanes, octanes and mixtures thereof, are used to wash the remaining unreacted sulfur chloride from the treated catalyst. Since the sulfur chlorides are colored, completion of the removal of the sulfur chloride can be ascertained from the color of the wash liquid.

Thereafter the catalyst is dried and then heated in a dry oxidizing atmosphere above about 700° F. up to 1600° F., preferably 800–1400° F. and more desirably 1200–1400° F., for at least one hour but usually less than ten hours, the shorter times being used with the higher temperatures. After the heating step the hydrogenating metal component is in the form of the catalytically active oxides. In a preferred embodiment of the method the carbonaceous deposits are also removed in the heating step and care should be exercised to avoid oxidation reaction run-aways to excessive temperatures. For this purpose, it is preferable to pass a dry combustion supporting gas such as a nitrogen-air mixture through the catalyst in order to promote the oxidative conversion and to sweep out the combustion products. Preferably, at least during the initial portion of the burn, the catalyst temperature is controlled in the range above 450° F. but below 750° F. Such heat treatment in an oxidizing atmosphere is continued until burning substantially ceases. When the catalyst is in one or more fixed beds, the catalyst is contacted with dry combustion supporting gas at below 750° F. until an initial burning wave has passed through the catalyst beds. Usually, some carbonaceous material still remains on the catalyst and some of the hydrogenating metal component is not completely converted to the oxide. Thereafter, the catalyst is contacted further with the dry combustion supporting gas at a maximum catalyst temperature of at least 50° F. higher than used in the first burn, but at a temperature controlled below 850° F. until the second burning wave passes through the catalyst beds. Usually, a final burn with the oxygen concentration increased and the temperature of the dry combustion supporting gas increased up to 950° to 1000° F. is carried out until no further burning is observed. Preferably, the oxidations are carried out with an elevated pressure of above 200 p.s.i.g., such as above 500 p.s.i.g up to 10,000 p.s.i.g. using a circulating inert gas to which is added .1 to 4 mol percent of oxygen during the initial portion of the oxidation and in which the oxygen content is gradually increased. In any event, the temperature is kept below that at which there is an appreciable loss in the surface area of the catalyst; usually the maximum temperature is about 1600° F. Preferably, the final temperature is below 1400° F. and more preferably below 1000° F.

The dry combustion supporting gas is preferably free of sulphur oxides and may be any suitable mixture of oxygen with an inert carrier gas. Examples are nitrogen-air flue gas air mixtures. Where the gas is recycled, it is preferred to remove combustion products such as $CO_2$, $SO_2$ and $H_2O$ to prevent their build-up in the circulating gas. For this purpose the gas may be scrubbed with a caustic solution or may be subjected to catalytic or adsorptive contacting.

By "dry" combustion supporting gas is meant that the molar concentration of water vapor is relatively low, that is, at least below about 6 mol percent and preferably below 1 mol percent.

Following the oxidation step, the catalyst may be variously treated prior to use or can be used directly in hydrogenative conversion operations. Such treatments can include thermactivation, reduction, and sulfiding. Where the catalyst is to be placed in a hydrocracking operation, the catalyst can be used without further treatment, particularly with sulfur-containing feeds which would sulfide the catalyst during start up to the desired sulfide state for the hydrogenating metal component such as nickel.

The preferred final step in preparing the catalyst for reuse in hydrocracking operations is to convert the hydrogenating metal component to the sulfide. This may be accomplished in any of the several known ways such as by contacting the catalyst with a sulfiding agent such as $H_2S$, mixtures of hydrogen and $H_2S$ and mixtures of hydrogen and organic sulfur compounds reducible to $H_2S$ at the conditions employed. Generally, the catalyst temperature during sulfiding is controlled below 850° F. and preferably below 750° F. The best results are obtained by contacting the oxidized catalyst with a mixture of hydrogen and vaporized organic sulfur compounds such as dimethyl disulfide, isopropyl mercaptan or carbon disulfide at temperatures in the range of 450–650° F. An excess of sulfiding agent is usually employed to insure substantially complete conversion of the oxide of the hydrogenating metal component to the sulfide.

By the above-described procedure, deactivated hydrogenative conversion catalysts can be rejuvenated to a substantial percentage of the original, fresh activity so that the over-all useful life of the catalyst is greatly extended. When applied to the preferred hydrocracking catalysts, particularly to such catalysts with nickel or cobalt hydrogenating metal components, the economic application of the hydrocracking is greatly expanded. Hence, the rejuvenation procedure is especially desirable to use as part of a hydrocracking process. In such process, hydrocarbon stocks including hydrocarbon distillates boiling from about 300° to 1100° F., hydrocarbon residuals boiling above about 1050° F., and mixtures thereof are hydrocracked to more valuable lower boiling products by contacting such feeds in a hydrocracking zone with a catalyst comprising the hydrogenating-dehydrogenating component on an active, acid, cracking support at a temperature from 450° to 900° F., preferably for a major portion of the on-stream period below 750° F., a space velocity of from about 0.2 to 5.0 LHSV or more, and a hydrogen partial pressure of at least 350 p.s.i.g. with at least 1000 s.c.f. of hydrogen per barrel of feed, there being consumed in the hydrocracking zone at least 500 s.c.f. of hydrogen per barrel of feed converted to products boiling below the initial boiling point of said feed. While metal sulfides such as nickel sulfide are preferred as the hydrogenating-dehydrogenating component in such hydrocracking conversions, other suitable hydrogenating components are the compounds of metals of Groups VI and VIII of the Periodic Table. Combinations of metal sulfide with one or more metals and compounds thereof from Groups VIII, VI–B and I–B of the Periodic Table may be used. The amount of the hydrogenating component may be varied from 0.5 to 35% or more, more desirably in the range of 4 to 20%, based on the weight of the entire catalyst composition. The remaining, or cracking, component of the hydrocracking catalyst may be selected from the various siliceous cracking catalysts, such as the composites of silica-alumina, silica-magnesia, silica-alumina-zirconia, silica-zirconia-titania and synthetic metal aluminum silicates (including synthetic chabazites normally referred to as "molecular sieves") which have been found to impart the necessary degree of cracking activity to the catalyst. In this connection, the term "high cracking activity" is employed herein to designate those catalysts having activity equivalent to a CAT A value of at least 25 or a quinoline number of at least 20 (J. Am. Chem. Society, 72, 1554 (1950)). These cracking components or supports for the hydrogenating metal component are normally readily attacked by strong aqueous acid. Particularly preferred catalyst components are synthetically prepared silica-alumina compositions having a silica content in the range of from about 15 to 99% by weight and an alumina content of 1 to 85% by weight. The hydrocracking conversion is normally preceded by a treatment to remove excess nitrogen content from the hydrocarbon charging stocks. Preferably, this is accomplished by a hydrodenitrification process comprising contacting said feed with hydrogen in a suitable catalyst under hydrofining conditions, such as a space velocity of 0.2 to 10 LHSV, a pressure of 500–5000 p.s.i.g. and a temperature of 500–850° F.

The activities of catalysts can be compared in terms of their ability to convert a feed stock to lower boiling products. One way to make such comparison is to determine the amount of conversion at standard conditions of a feed stock such as n-decane in the presence of the catalyst to be compared. By determining the relative conversion under the same operating conditions for fresh and treated catalysts, one gets a measure of the activity of a rejuvenated catalyst compared to the fresh catalyst.

In the following more detailed descrption, the invention is described for illustrative purposes in terms of a hydrocracking catalyst composed of a nickel sulfide as the hydrogenating metal component disposed on a siliceous cracking support such as silica-alumina. The rejuvenation method of the present invention is employed following an extended on-stream period of at least 500 to 750 hours, usually over 1000 hours, up to several thousand hours, e.g., 4000 hours, under hydrocracking conditions. After such rejuvenation to an activity approaching its original activity, the catalyst is placed back in hydrocracking service for subsequent cycles of extended on-stream periods of at least 500 hours, generally over 750 hours and usually over 1000 hours.

To illustrate the process of the present invention, tests were carried out on catalyst which were prepared by the by the procedure of the following example.

*Example 1*

A catalyst containing nickel sulfide on silica-alumina was prepared by impregnating silica-alumina particles with a solution of nickel nitrate in a concentration sufficient to provide the catalyst with 6 weight percent nickel on a dry basis. The silica-alumina particles contained about 90% silica and had a CAT A value in excess of 40 before being impregnated with the hydrogenating metal component. After impregnation and drying, the catalyst was thermaactivated by contact for 2.2 hours with a stream of hot air at an average temperature of 1430° F., said thermactivation treatment forming the subject of application Serial No. 795,109 filed February 18, 1959. Thereafter the catalyst was sulfided and used for hydrocracking in a multibed reactor for several thousand hours on a hydrocarbon feed stock having a total nitrogen content of less than 1 p.p.m. The hydrocracking operation was discontinued when the temperature necessary to maintain hydrocracking conversion of the hydrocarbons at 60% had risen to approximately 750° F. An analysis of the catalyst at this stage showed that it had metal crystallite sizes of the order of 500 to 2000+A., with the larger particles in the first bed. Air blowing the spent catalyst by conventional procedures to remove carbonaceous deposits produces catalysts having low activities. Particularly poor results are obtained with the catalysts having the larger size metal crystallites.

*Example 2*

In a series of tests the relative activities of catalysts subjected to different treatments were compared by measuring their effectiveness for cracking n-decane. In this series, Catalyst A was a freshly prepared catalyst produced as described in Example 1. The remaining catalysts before treatment were spent catalysts as described in Example 1, all taken from the same bed and having metal crystallite sizes ranging from about 700–1200 A. The catalysts were treated with various agents as shown in table below. Catalysts B through F were subjected to treatment with a sulfur-chlorine compound at its boiling point for two hours. Catalyst G was treated with a 10% solution of sulfur monochloride in mixed hexanes at about 65° F. for 2 hours. Catalyst H was subjected to a gaseous mixture of 15% sulfur monochloride and 85% carbon dioxide at 1000° F. for 4 hours. All Catalysts B through H were freed of sulfur chloride by washing with benzene and mixed hexanes until the wash liquid was uncolored. Catalyst I was used as a standard, being regenerated by air oxidation only. Each of the catalysts after drying was heated in dry air for two hours at the temperature indicated in the table. Then the catalysts were sulfided at 600° F. with hydrogen sulfide and used to hydrocrack n-decane in a continuous flow fixed bed, high pressure micro-catalytic reactor. In such test 3 ml. of catalyst is supported inside of a 0.79 cm. I.D. stainless steel tube surrounded by a heavy walled metal block inside an electrically heated oven. Catalyst temperatures are measured by a Chromel-Alumel thermocouple located on the reactor wall at the central portion of the catalyst bed. Said rates are measured by a micro-feeder pump, and the hydrogen rate is measured by a wet test meter. Liquid and gaseous products are analyzed by gas chromatography. In the tests of each of the catalysts, the following conditions are observed. n-decane is fed at a liquid hourly space velocity of 16.0 along with hydrogen at a hydrogen/decane mol ratio of 10 and brought into contact with the catalyst at a temperature of 550° F. and a total pressure of 1185 p.s.i.a.

The results of the tests on the above catalyst are shown in the following table:

| Catalyst | Treating Agent | Calcination Temperature, °F. | Relative Conversion Activity |
|---|---|---|---|
| A Fresh | None | | 100 |
| B Spent | $S_2Cl_2$ | 600 | 1 |
| C Spent | $S_2Cl_2$ | 800 | 50 |
| D Spent | $S_2Cl_2$ | 1,200 | 55 |
| E Spent | $SCl_2$ | 1,000 | 60 |
| F Spent | $SOCl_2$ | 1,000 | 40 |
| G Spent | $S_2Cl_2$-Hexane | 1,000 | 46 |
| H Spent | $S_2Cl_2$-$CO_2$ gas | 1,000 | 4 |
| I Spent | None | 1,000 | 5 |

The above tests illustrate that contacting spent catalysts with liquid sulfur chloride at elevated temperature followed by heating above about 700° F. brings about a substantial rejuvenation of the spent catalyst, thereby permitting the catalyst to be used for an additional extended period. It is also noted that treatment with a sulfur chloride-containing gas is not satisfactory. Likewise satisfactory rejuvenation is not obtained if after contacting with liquid sulfur chloride the heating is conducted at too low a temperature, as with Catalyst B. The metal crystallites in the more active rejuvenated catalysts were found to be between ⅓ and ¼ the size of the metal crystallites in the spent catalyst before treatment, thus indicating that the catalyst was restored to its initial condition and capable of use in long periods.

*Example 3*

A sample of a catalyst from a lower bed than those used in Example 2 and having metal crystallite sizes ranging from about 200 A. to 600 A. was treated for two hours with sulfur monochloride. After washing out the excess sulfur chloride with benzene and mixed hexanes, the catalyst was air dried and then heated in a stream of dry air for two hours at 1400° F. In the decane cracking test the catalyst so rejuvenated gave about 95% of the conversion obtained with fresh catalyst.

*Example 4*

Comparative hydrocracking tests were also carried out using a selected standard and readily obtainable hydrocarbon feed stock. In these tests, conducted in a continuous pilot plant, the conditions were maintained the same at 550° F., and 1200 p.s.i., a liquid hourly space velocity of feed passing through the catalyst of 2 and a once-through hydrogen rate of 12,000 s.c.f. per barrel of feed. The conversion activity is conveniently measured by determining the change in gravity in ° API, referred to as an "activity index." The feed stock selected for this test was a catalytic cycle oil obtained as a distillate fraction from a fluid type catalytic cracking unit, the fraction being one containing essentially equal proportions of aromatics and of paraffins plus naphthenes, which distillate is hydrofined to produce a stock having the following inspections:

| | |
|---|---|
| Gravity, ° API | 29.2 |
| Aniline point, ° F. | 100.2 |
| Nitrogen (basic), p.p.m. | 0.3 |
| Aromatics, vol. percent | 47 |
| Naphthenes, vol. percent | 37 |
| Paraffins, vol. percent | 19 |

ASTM Distillation (D–158):

| | |
|---|---|
| Start | 362 |
| 5% | 441 |
| 10% | 453 |
| 30% | 481 |
| 50% | 500 |
| 70% | 523 |
| 90% | 560 |
| 95% | 577 |
| End point | 624 |

The test catalysts were a freshly prepared catalyst (the same as used is Example 2) and a rejuvenated catalyst prepared by treating the spent catalyst used in Example 2 in boiling sulfur monochloride for two hours, washing out the excess sulfur chloride with benzene and mixed hexanes, drying and heating the catalyst in dry air for two hours at 1000° F. The catalysts were then sulfided as described in Example 2 and subjected to the hydrocracking test. The tests were run for about 35 hours during which from time to time the activity index of the catalyst was determined. The rejuvenated catalyst had activity indexes ranging from 15.7 at 8–10 hours to 12.5 at 32–34 hours. The fresh catalyst had activity indexes at the same times of 29.2 and 25.1. Hence, the rejuvenated catalyst maintained about 50% of fresh catalyst activity throughout the test.

These results illustrate that by the process of the present invention deactivated catalysts can be rejuvenated so that the life of the catalyst can be substantially extended. Such extension of catalyst life contributes significantly to the economic value of the low temperature hydrocracking process.

The use of liquid sulfur chlorides either in the hydrocarbon conversion reactor without removing the catalyst or in a separate vessel is a suitable method for rejuvenating catalysts, particularly hydrocracking catalysts because the sulfur chlorides are relatively inexpensive. The process avoids aqueous solutions which generally are deleterious to catalysts and contribute to corrosion. It is also important from the economic standpoint to note that the process of treating with liquid sulfur chloride, washing with non-aqueous solvents and heating in air streams to convert the sulfur chloride-hydrogenating metal reaction products to an active form and to remove the carbonaceous deposits, all can be carried out in the usual alloy steel reactors while incurring little corrosion.

I claim:

1. A process for rejuvenating a supported hydrogenating catalyst which, before long exposure to hydrocarbon feed under hydrogenative conversion conditions, is an active catalyst composed of at least one hydrogenating metal component selected from the group consisting of Group VIII metals and compounds thereof exclusive of noble metals and compounds thereof, disposed on a high surface area support, but which catalyst after long exposure to hydrocarbon feed under hydrogenative conversion conditions has accumulated carbonaceous deposits and has become deactivated with the metal hydrogenating component so changed that conventional removal of the accumulated carbonaceous deposits does not result in recovery of a substantial percent of the original hydrogenative conversion activity, which process comprises contacting said deactivated catalyst with dry liquid sulfur chloride at a temperature above 100° F. up to the boiling point of the sulfur chloride for at least 1 hour, then removing unreacted sulfur chloride from the catalyst, and thereafter heating said treated catalyst in a dry oxiding atmosphere at 700 to 1600° F. for at least one hour.

2. The process of claim 1 wherein said liquid sulfur chloride is brought into contact with the deactivated catalyst before removal of the carbonaceous deposits thereon and wherein the carbonaceous deposits are removed from the catalyst in said heat treating step.

3. The process of claim 1 wherein said deactivated catalyst is contacted with liquid sulfur chloride for two to five hours with the sulfur chloride at its boiling point.

4. The process of claim 1 wherein the heating step is carried out in the presence of a dry flowing oxidizing gas at a temperature of 1000 to 1400° F.

5. In a process for hydrocracking hydrocarbon stocks at elevated temperatures and pressures with excess hydrogen and a supported hydrocracking catalyst which before long exposure to hydrocarbon feed under hydrocracking conditions is an active catalyst composed of at least one hydrogenating metal component selected from the group consisting of Group VIII metals and compounds thereof, other than the noble metals and compounds thereof disposed on a high surface area cracking support, but which catalyst after long exposure to hydrocarbon feed under hydrocracking conditions has accumulated carbonaceous deposits and has become deactivated with the metal hydrogenating component so changed that conventional removal of the accumulated carbonaceous deposits does not result in recovery of an adequate percentage of the original hydrocracking activity, the improvement which comprises extending the effective on-stream time by rejuvenating said catalyst when it becomes so deactivated by contacting said deactivated catalyst before removal of said carbonaceous deposits with dry liquid surfur chloride at a temperature above 100° F. up to the boiling point of the sulfur chloride for at least one hour, then removing unreacted sulfur chloride from the catalyst, thereafter heating said treated catalyst in a dry oxidizing atmosphere at 700° F. to 1000° F. for at least one hour to remove the carbonaceous deposit and to activate the catalyst, and subsequently conducting hydrocracking operations over the resulting rejuvenated catalyst.

6. The process of claim 1 wherein said deactivated catalyst contains 4 to 20% of hydrogenating metal component.

References Cited by the Examiner
UNITED STATES PATENTS
3,122,510   2/1964   Burk et al. _____ 252—412

ALPHONSO D. SULLIVAN, *Primary Examiner.*